United States Patent [19]

Hill, III

[11] Patent Number: 5,646,819
[45] Date of Patent: Jul. 8, 1997

[54] KITCHEN CABINET WITH A COMPUTER WORK STATION

[76] Inventor: Ralph S. Hill, III, 20637 Hartsbourne Way, Germantown, Md. 20874

[21] Appl. No.: 504,237

[22] Filed: Jul. 19, 1995

[51] Int. Cl.⁶ .................................................. G06F 1/16
[52] U.S. Cl. .................... 361/683; 312/223.2; 361/724; 361/727
[58] Field of Search ............................. 361/680, 681, 361/682, 683, 724–727; 312/223.1, 223.2, 223.3, 242, 243, 245, 270.2, 321.5, 138.1, 326, 234, 234.3; 248/917, 918; 364/708.1

[56] References Cited

U.S. PATENT DOCUMENTS

| D. 349,693 | 8/1994 | Brossardt | D14/102 |
|---|---|---|---|
| 1,590,692 | 6/1926 | Lewis | 312/223.1 |
| 4,073,556 | 2/1978 | Wilson, Jr. | 312/250 |
| 4,458,960 | 7/1984 | Dunst | 312/138.1 |
| 4,603,925 | 8/1986 | Cuevas-Cumming | 312/196 |
| 4,718,740 | 1/1988 | Cox | 312/208 |
| 4,827,439 | 5/1989 | Licht | 364/708.1 |
| 4,886,325 | 12/1989 | Rockola et al. | 312/138.1 |
| 5,281,018 | 1/1994 | Cullinan | 312/223.2 |
| 5,329,865 | 7/1994 | McWard | 109/50 |
| 5,355,279 | 10/1994 | Lee et al. | 361/681 |
| 5,375,076 | 12/1994 | Goodrich et al. | 364/708.1 |

FOREIGN PATENT DOCUMENTS

1818070A1  5/1993  U.S.S.R. .................... 312/223.2

*Primary Examiner*—Leo P. Picard
*Assistant Examiner*—Lynn D. Feild
*Attorney, Agent, or Firm*—Ronald B. Sherer

[57] ABSTRACT

A computer workstation is disclosed which comprises a kitchen cabinet having a front door with a note-type computer screen mounted on the door, and with supports for holding a keyboard and/or electronic pen on the cabinet.

10 Claims, 2 Drawing Sheets

KITCHEN CABINET WITH A COMPUTER WORK STATION

FIELD OF THE INVENTION

This invention relates to computer work stations, and more particularly, to a system for mounting a note-type computer in a kitchen cabinet whereby the kitchen may become a computer center.

BACKGROUND

In recent years, the home use of personal computers has become extremely widespread. However, because of size and space requirements, such computers have been utilized only in such locations as a home-office, a study, or a bedroom, and such locations are remote from the center of home activities which generally revolve about the kitchen area.

With the advent of smaller computers, such as the so-called notebook and notepad types, as described for example, in U.S. Pat. No. 5,355,279 and 5,375,076, the use of such computers has become possible in more locations. Use in the kitchen, however, such as on the kitchen table, or on a kitchen countertop, is not viable due to the ever-present risk of spills of liquids which can damage or destroy the computer, and particularly the keyboard if exposed to moisture of any kind. In addition, kitchen countertop space is always at a premium, and the use of any computer on the kitchen table must be constantly interrupted as the table is used for meals and other family activities.

SUMMARY

The present invention enables the safe and convenient use of notebook and notepad type computers in the kitchen such that the kitchen can become the computer center of the house as well as the center of other family activities. The present invention provides a system whereby the screen of a notebook or notepad computer (referred to herein generically as "note-type" computers), may be mounted on the door of a kitchen cabinet, and the keyboard of a notebook computer or the electronic pen of a notepad computer may be mounted on or under the cabinet immediately adjacent the computer screen.

These and other objects and advantages will become more fully apparent from the following description of several preferred embodiments of the invention as illustrated in the following drawings.

DETAILED DESCRIPTION

Figure 1:
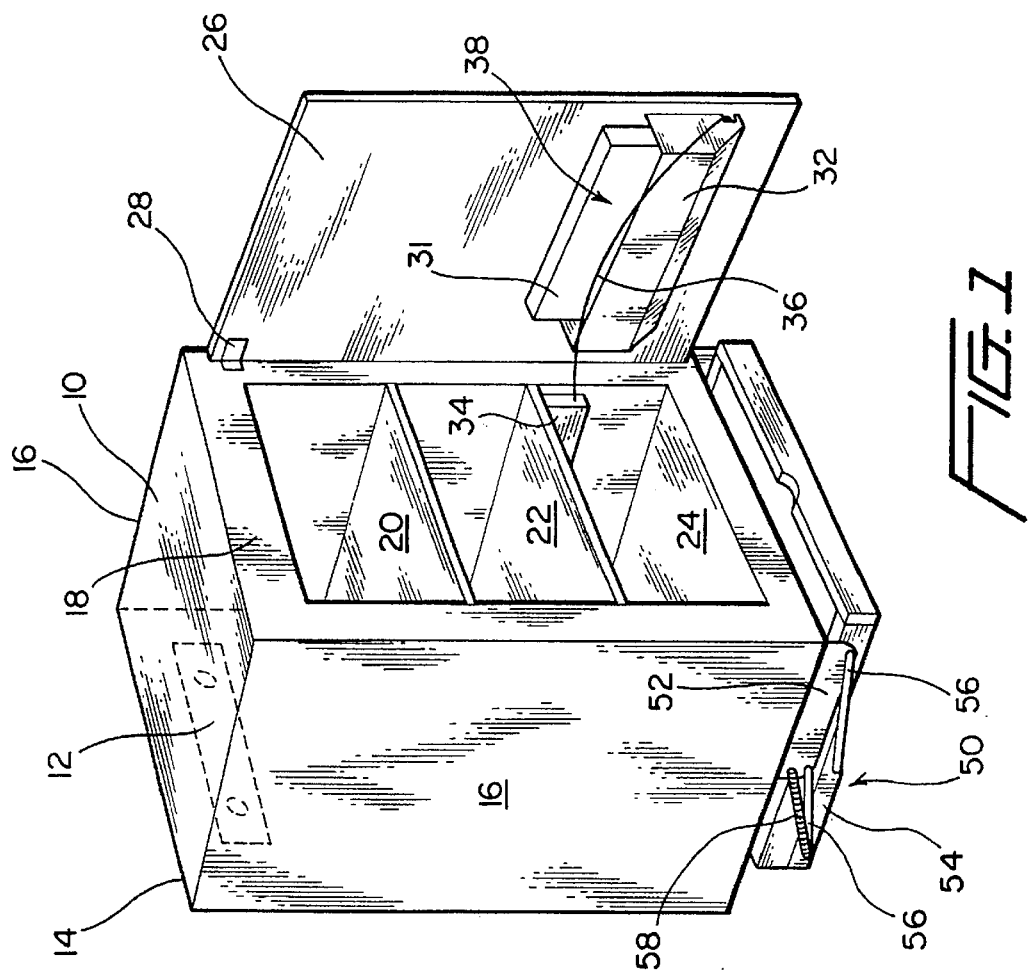
FIG. 1 is a perspective view illustrating a wall- or ceiling-mounted kitchen cabinet with the cabinet door open and the computer keyboard in the stored position.
Figure 2:
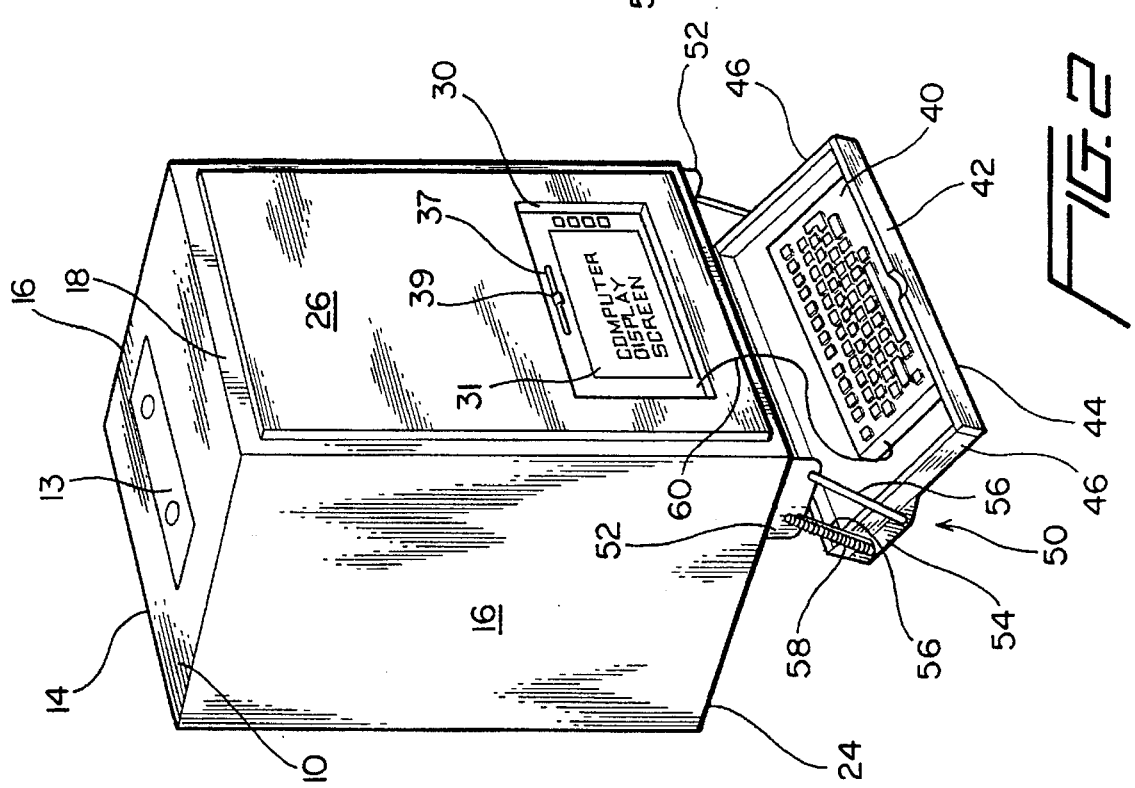
FIG. 2 is a perspective view illustrating the same kitchen cabinet with the cabinet door closed such that the computer screen is visible, and with the keyboard in the operative position for use.

Referring to FIGS. 1 and 2, numeral 10 indicates a conventional kitchen cabinet usually composed of wood which is manufactured with standard mounts 12 and 13 so as to be mounted on a kitchen wall or ceiling. The cabinet has a rear wall 14, a pair of side walls 16, a front frame 18, and a plurality of shelves 20, 22 and 24; shelf 24 also forming the bottom of the cabinet. Cabinet 10 includes a conventional front door 26 which is connected to frame 18 by a pair of hinges 28 the upper one of which is visible in FIG. 1.

The cabinet described thus far is of the type found in most kitchens and may have more or less shelves than those illustrated, and may or may not have additional trim components. However, the present invention provides that door 26 have a generally rectangular hole 30, and that hole 30 preferably be positioned in the lower portion of the door as illustrated so as to be essentially at eye level when the cabinet is mounted in the kitchen. On the backside of door 26, a mount is provided which may be in the form of pocket-shaped support 32. Support 32 may be composed of any rigid material such as wood, plastic or the like. The bottom edge of the support is mounted at or slightly below the lower horizontal edge of hole 30 such that the screen portion 31 of a note-type computer may be placed in and supported by the pocket-shaped support 32 with the computer screen facing outwardly through hole 30 so as to be fully visible to the user when standing in front of the cabinet.

While notebook and notepad computers may be operated for substantial periods of time powered by internal batteries, the present invention preferably mounts a standard computer power source 34 in the cabinet, and the power source is connected to computer 31 by a flexible connector 36. If power source 34 is an AC/DC converter, it will be understood that the AC cord may be run through the cabinet and plugged into any available wall outlet, not shown.

The mode of inputting data and instructions to the computer depends upon the type of computer selected to be mounted on the door. For example, voice-activated note-type computers do not require a separate input device. However, notepad computers require a pen for inputting, and pen 37 shown in FIG. 2 may be secured for ready use in a clip 39 mounted on the front of door 26 or directly on the computer screen.

Notebook type computers require a keyboard to enter data and instructions, and the present invention provides a tray 42 for supporting and using a keyboard 40. As further shown in FIGS. 1 and 2, tray 42 includes a bottom panel 44 supporting the keyboard 40 between four side walls 46.

Tray 42 is supported by a hinge mechanism generally indicated by numeral 50. In the embodiment of FIGS. 1 and 2, this hinge mechanism comprises a pair of upper brackets 52 secured to the bottom 24 of the cabinet, and a pair of lower brackets 54 secured to tray 42. Each pair of brackets 52 and 54 are pivotally connected to each other by first and second pivot rods 56 such that the brackets and the pivot rods form a parallelogram. In this manner, tray 42 containing the computer keyboard may be pivoted downwardly to the operative position shown in FIG. 2 for convenient use, and it may be pivoted upwardly to the stored position shown in FIG. 1 where it is completely out of the way directly under the cabinet. A spring 58 may also be included in the hinge mechanism to assist in holding the tray in the operative and stored positions, or a conventional clasp or latch (not shown) may be substituted for the spring. In general, such parallelogram-type hinges are commercially available such that further description is not necessary.

In use, tray 42 containing keyboard 40 is simply pivoted downwardly and forwardly into the convenient and operative position shown in FIG. 2. If a permanent wire connection is not provided between the screen and the keyboard, a plug-in type connector wire 60 is connected therebetween. In this manner, if it is desired to use the computer in another location, the keyboard is simply unplugged, and it and the screen may be lifted out of their respective supports.

Figures 3, 4:
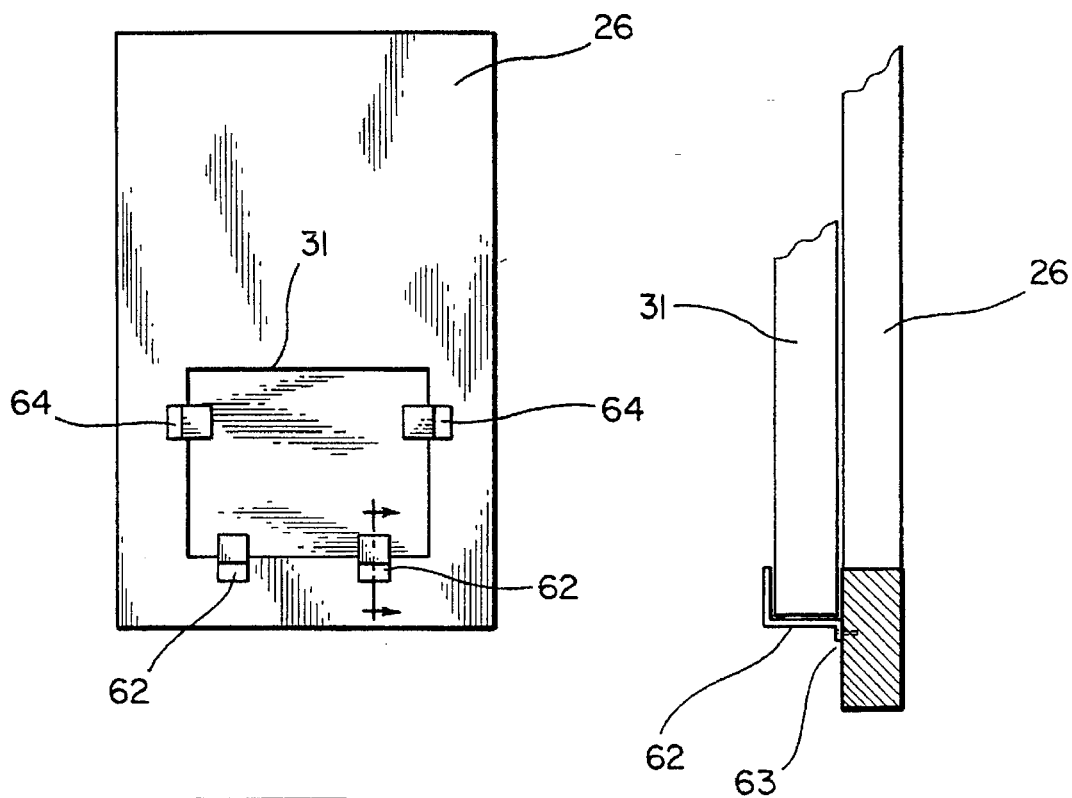
FIG. 3 is an elevational view of the back of a cabinet door illustrating an alternative form of support means for removably mounting the computer screen on the cabinet door.
FIG. 4 is a sectional view taken along view line 4—4 of FIG. 3.

The pocket-shaped support 32 is preferred from the standpoint that it provides a space 38 between the support and the back of computer screen 31 which provides access to the power controls, floppy disk and terminals for connecting a printer. However, other forms of supports are possible, one of which is shown in FIGS. 3-4. In this embodiment, a first pair of Z-shaped brackets 62 are mounted on the back of door 26, such as by wood screws 63, and the lower edge of the computer screen rests in and on brackets 62. A second pair of similar brackets 64 are mounted on the back of door 26 and positioned such as to hold the side edges of the computer screen against the backside of the door. As in the previous embodiment, the computer screen may be easily lifted out of the supports so as to be usable in other locations. In addition, it will be understood that other forms of brackets and supports may be used to retain the computer screen in position so as to be visible through opening 30 such as, for example, brackets similar to brackets 62, 64 but having adhesive strips to secure the brackets to door 26 instead of screws 63. Also, it is to be understood that computer screen 31 may be mounted on the front of door 26, thereby eliminating hole 30; however, one or more other holes are then required through the door for connecting the power cord, the printer and telephone connection if the computer is to be connected to a telephone.

Figure 5:
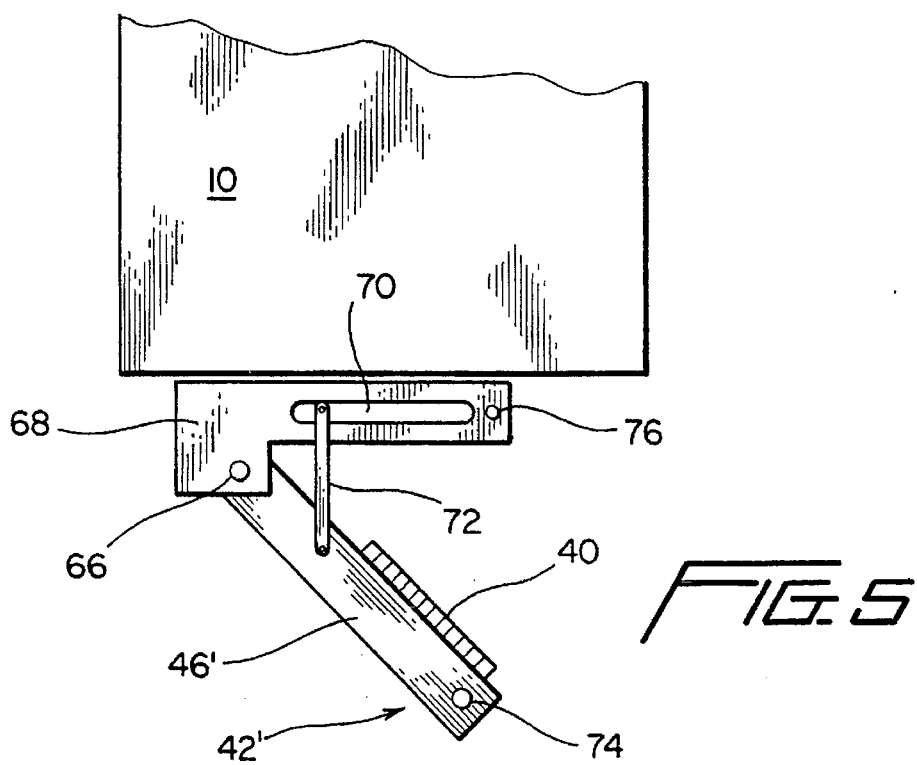
FIG. 5 is a side view of an alternative hinge structure for pivoting the keyboard into and out of its operative position.

It will also be understood that the present invention is not limited to the use of a parallelogram type hinge as previously described. For example, as shown in FIG. 5, tray 42' may be pivoted at 66 to a bracket 68 which is mounted to the bottom of cabinet 10. Bracket 68 also includes a slot 70 which receives the upper end of a pivoting link 72, the lower end of which is pivotally connected to one of side walls 46' of tray 42'. When the keyboard is to be stored, the front edge of the try is lifted while sliding the upper end of link 72 forwardly in slot 70 until the tray is positioned horizontally beneath the cabinet. The tray may be retained in this horizontal position by a detent 74 protruding outwardly from side frame 46 which engages in a catch 76 in bracket 68, or by a clasp or other form of known latch means.

It will also be understood that, instead of pivoting downwardly as described with respect to FIGS. 1, 2 and 5, tray 42 and the keypad may slide forwardly as a drawer in side-mounted tracks (not shown) whereby the keyboard remains horizontal and extends forwardly of the cabinet in its operative position. However, it has been found that such horizontal position of the keyboard is not nearly as convenient for use as when the keyboard is positioned at an angle with respect to the horizontal. Thus, while the keyboard may be operated at angle with respect to the horizontal in the order of 0 to 45 degrees, it is preferred that the keyboard extend at an angle with respect to the horizontal in the order of 20–40 degrees, and more preferably in the order of 25–35 degrees.

The present invention may be commercially practiced in any one of several ways. For example, a pre-drilled cabinet door with a pre-cut hole 30 may be provided for use on new cabinets, or to replace the existing door on existing cabinets. Alternatively, a template may be provided for cutting the proper size hole which would be specific to the model of computer to be installed. The template would then be used by the purchaser, or the door may be taken to be cut by another professional. In either event, it is also preferred to provide a template for marking the proper positions of the brackets 52 and 68 for securing the computer tray 42 to the bottom of the cabinet.

From the foregoing description of several preferred embodiments of the invention, it will be apparent that the present invention provides a simple, inexpensive and easy to install system for mounting a note-type computer in a standard wall- or ceiling-mounted kitchen cabinet whereby the computer components are protected from damage and are extremely convenient for use by the entire family. Thus, such computers may be safely utilized in the kitchen where messages, schedules, appointments, and other information may be entered, stored and exchanged by family members. In addition, it may be used for E-mail, on-line use, use on the Internet and electronic banking and all of these functions may be performed by all members of the family in the central location of the kitchen. Of course, many variations of the present invention will become apparent to those skilled in the art such as, for example, the fact that the video screen portion of a video-telephone may be mounted in the kitchen cabinet in addition to, or in place of, the computer screen such that the term "electronic screen" is intended to be generic to both computer and video-telephone screens. Therefore, it is to be understood that the foregoing description is intended to be purely illustrative of the principles of the invention, rather than limiting thereof, and that the scope of the invention is not intended to be limited other than as expressly set forth in the following claims interpreted under the doctrine of equivalents.

What is claimed is:

1. In combination,
    (a) a kitchen cabinet, said kitchen cabinet including a vertically extending front portion and a vertically extending door closing said front portion, said door having front and back surfaces;
    (b) means for mounting said kitchen cabinet on a kitchen wall or ceiling;
    (c) a generally rectangular hole in said door;
    (d) a note-type commuter screen;
    (e) computer screen mounting means for mounting said note-type computer screen on the back surface of said door, said rectangular hole being of a size and shape such that said screen is visible through said hole; and
    (f) means for inputting instructions to said computer screen.

2. The combination of claim 1 wherein said computer screen mounting means comprise a pocket-shaped support, and said computer screen is supported by and removable from said pocket-shaped support.

3. The combination of claim 1 wherein said computer screen mounting means comprise a plurality of brackets.

4. The combination of claim 1 wherein said means for inputting instructions to said computer screen comprise a computer keyboard, and tray means for mounting said keyboard immediately below said kitchen cabinet.

5. The combination of claim 4 wherein said tray means include pivoted means for storing said keyboard in a horizontal position and pivotable to an operating position in which said keyboard extends in a plane at an angle to the horizontal.

6. The combination of claim 5 wherein said angle is within the range of 20 to 40 degrees with respect to the horizontal.

7. The combination of claim 5 further including first and second pairs of brackets pivotally connected by first and second pairs of pivot rods forming a parallelogram-type hinge.

8. A computer center for use in the kitchen comprising:
   (a) a kitchen cabinet, said kitchen cabinet having a vertically extending door and a bottom portion, said door having front and back surfaces;
   (b) a note-type computer screen;
   (c) first mounting means on said door of a size and shape for mounting said computer screen on said vertically extending door;
   (d) electronic means for inputting instructions to said computer screen;
   (e) second mounting means on said kitchen cabinet for mounting said electronic means on said kitchen cabinet;
   (f) said electronic means comprising a keyboard, and said second mounting means comprising pivoted hinge means for pivoted movement of said keyboard downwardly from a first horizontal and inoperative position immediately adjacent said bottom cabinet portion to a second non-horizontal and operative position.

9. A computer center for use in the kitchen comprising:
   (a) a kitchen cabinet, said kitchen cabinet having a vertically extending door and a bottom portion, said door having front and back surfaces;
   (b) a note-type computer screen;
   (c) first mounting means on said door of a size and shape for mounting said computer screen on said vertically extending door, said first mounting means being positioned on said front surface of said door;
   (d) electronic means for inputting instructions to said computer screen; and
   (e) second mounting means on said kitchen cabinet for mounting said electronic means on said kitchen cabinet.

10. A computer center for use in the kitchen comprising:
    (a) a kitchen cabinet, said kitchen cabinet having a vertically extending door and a bottom portion, said door having front and back surfaces;
    (b) a note-type computer screen;
    (c) first mounting means on said door of a size and shape for mounting said computer screen on said vertically extending door;
    (d) electronic means for inputting instructions to said computer screen;
    (e) second mounting means on said kitchen cabinet for mounting said electronic means on said kitchen cabinet;
    (f) said door including a generally rectangular hole, and said first mounting means removably mounting said computer screen on said back surface of said door so as to be viewable through said hole.

* * * * *